July 24, 1951 C. W. PROCHASKA 2,561,635
HOSE CLAMP
Filed Aug. 2, 1948

Inventor
CARROLL W. PROCHASKA

Cushman, Darby & Cushman
Attorneys

Patented July 24, 1951

2,561,635

UNITED STATES PATENT OFFICE 2,561,635

HOSE CLAMP

Carroll W. Prochaska, Mount Vernon, N. Y.

Application August 2, 1948, Serial No. 42,069

3 Claims. (Cl. 24—19)

Hose clamps, in modern practice, are of two general types. In one type the clamp is constricted about the hose by drawing the ends of the clamping band together. In the other type the ends of the clamping band are overlapped and the band is constricted by forcing the ends of the clamping band apart. Both are conventional and old in the art.

The band herein shown and described is of the type in which band ends are overlapped and forced apart to constrict the band on the hose and presents certain novel and useful structural improvements over clamps of present construction.

Briefly stated, it comprises a clamp, preferably of wire, bent to form an endless band member, with two hose constricting limbs, which limbs terminate at one end in a relatively small, upturned, screw-receiving eye and a larger upturned nut-receiving loop at the other end. Detachably mounted in the loop of the band is a buckle member in which is threadedly engaged a screw, the end of which engages the eyes at the other end of the band when the band ends are in overlapped position. Upon rotation of the screw the lapped ends are separated and constriction of band about the hose results.

In the drawings herewith forming part of this disclosure one physical embodiment of the invention is shown, but it will be understood that this showing is illustrative only and not restrictive.

Figure 5:
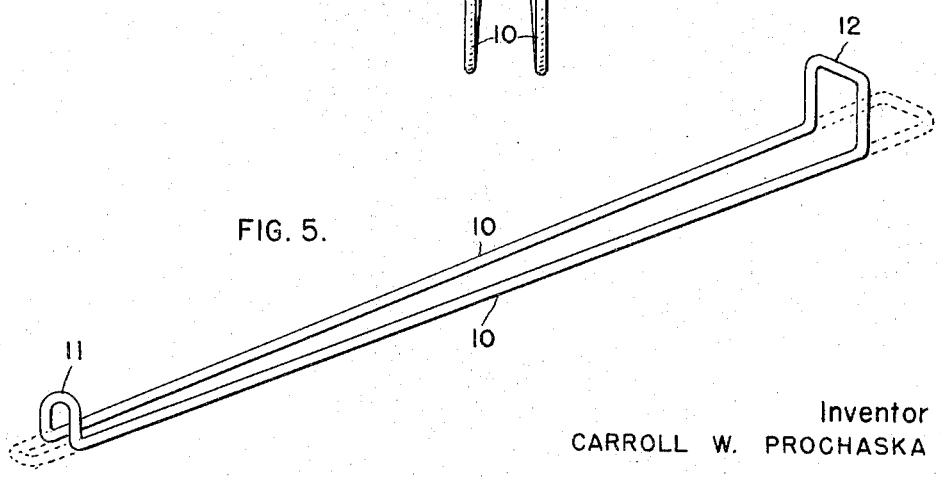
Figure 5 is a view in perspective of the endless band member of which the band is formed.

Referring to the drawings by numbers, the same numbers designating the same parts in the several views, the clamping band is here shown as having two hose clamping members 10 formed of a single piece of wire as shown in Fig. 5 by bending the endless wire loop to appropriate form and size to fit the hose. The wire loop will be initially drawn to the shape indicated in dotted lines in Fig. 5. One end will then be upturned to form a closed eye 11, while the other end will be upturned to form a closed loop 12, opposed to and in vertical parallel relation to the eye 11. Mounted in loop 12 of the band is a threaded buckle member 13 having a screw-receiving opening 14 for the band-constricting screw 15. The end 16 of screw 15 is preferably reduced to engage the relatively small eye 11 of the clamping band, so that when screw 15 is turned the lapped ends of the band will be separated and clamping action of the band on the hose effected.

The buckle 13 in which screw 15 is rotatably mounted is of substantially rectangular shape and removably placed in the loop 12 of the band in which it is positioned by means of flanges, four being here shown, projecting from the body or central part of the buckle. Side flanges 17 engage the side limbs of loop 12 and anchor the buckle 13 against the action of screw 15. An upper L-shaped flange 18 of substantially the width of loop 12 prevents lateral play of the buckle 13, the upturned portion of flange 18 preventing bodily forward shift of buckle 13 in loop 12. The lower stabilizing flange 19 of buckle 13 balances upper flange 18 and prevents lateral shift, overlying the adjacent portions of band members 10. It will be seen that the pressure of the clamp is increased as the screw 15 is fed forwardly to constrict the clamp, with the result that the lower flange or lip 19 provides a stabilizing effect, while the particular shape of the buckle 13 exerts a rigid pressure against the loop 12 so as to insure the screw being maintained in proper alignment with the buckle during the clamping operation.

Preferably, an eye-engaging washer 20 is engaged with the reduced end 16 of screw 15 to provide a proper bearing surface against the eye 11.

Figure 4:
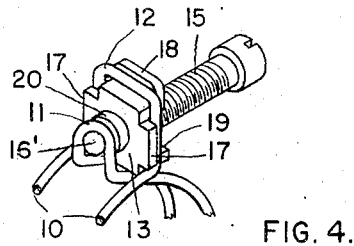
Figure 4 is a view of a portion of the clamp showing a slightly modified form of band-actuating screw.
Figure 2:
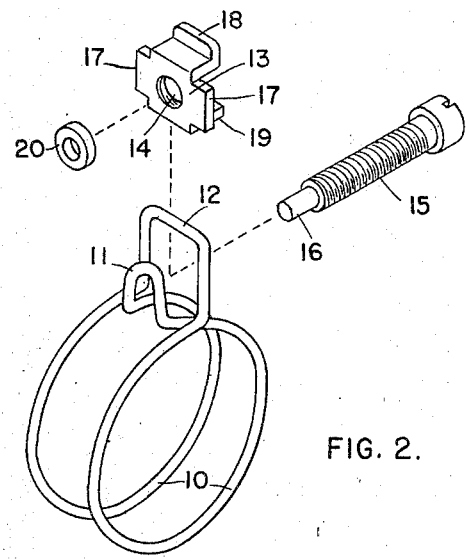
Figure 2 is an exploded view showing the parts in disassembled relation.
Figure 1:
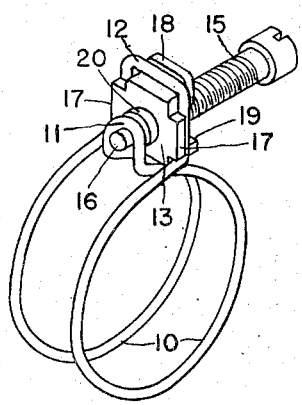
Figure 1 is a view in perspective of a clamp embodying the invention.
Figure 3:
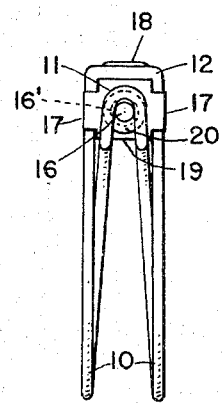
Figure 3 is an end view of the clamp looking from the left in Fig. 1.

In the form of the invention shown in Fig. 4, the structure is identical with that heretofore described except that the end 16 of the screw 15 is headed down as at 16' to engage the screw 15 with the eye 11 and hold the screw and eye in semi-permanent engagement. This does not, however, prevent the ready assembling and disassembling of the parts, for compression of the band permits buckle and screw to be freed from the loop and slight lateral shift allows the headed end 16' of screw 15 to be disengaged.

It will be seen that in the construction of the clamp herein disclosed the band and buckle are not secured together or in interlocked engagement with each other as in some constructions now in use and disclosed in the prior art. The buckle rests in the loop with its balancing flanges engaged with the limbs of the loop but freely movable relative thereto. With this arrangement the parts adjust themselves as the tightening screw is rotated and no binding or tensioning of the parts due to interlocked or permanently engaged parts can occur. This results in a clamp in which constriction on the hose is evenly effected throughout the entire area of the band. Assembling and disassembling of the parts is a simple matter. With the band bent to hose clamping position, the buckle, with its screw in place, may be slipped between the separated lapped ends of the band to engage the buckle-receiving loop at the end of the band, with the washer positioned on the end of the screw, and the screw engaged with the eye in the other end of the band. Upon setting up of the screw the ends of the band will be separated and the band clamped upon the hose with an evenly distributed tension.

Such changes from the specific construction here used for the purpose of illustration as involve only mechanical skill and as are comprehended by the appended claims are to be regarded as within the purview of the invention.

I claim:

1. A hose clamp comprising an endless wire frame including a body portion having two hose clamping limbs and overlapped ends, an integral screw receiving eye at one end of said clamp, a substantially inverted U-shaped integral buckle receiving loop at the other end of said clamp, said loop having vertical side limbs and a horizontal upper limb, a buckle having lateral flanges extending from opposite sides thereof engageable with said vertical side limbs, said buckle having a substantially L-shaped flange at the upper end thereof and a lower stabilizing flange, said L-shaped flange and said stabilizing flange extending rearwardly from the buckle and through said loop, said L-shaped flange having a vertical portion engaging said horizontal limb on the opposite side of the engagement of the L-shaped flange with said vertical flanges when the parts are assembled, and a screw mounted on said buckle and engageable with the eye of said clamp to spread the ends thereof and constrict the clamp.

2. A hose clamp comprising an endless wire frame including a body portion having two hose clamping limbs and overlapped ends, an integral screw receiving eye at one end of said clamp, a substantially inverted U-shaped integral buckle receiving loop at the other end of said clamp, said loop having vertical side limbs and a horizontal upper limb, a buckle having lateral flanges extending from opposite sides thereof engageable with said vertical side limbs, said buckle having a substantially L-shaped flange at the upper end thereof, said L-shaped flange extending rearwardly from the buckle and through said loop, and having a vertical portion engaging said horizontal limb on the opposite side of the engagement of the L-shaped flange with said vertical flanges when the parts are assembled, and a screw mounted on said buckle and engageable with the eye of said clamp to spread the ends thereof and constrict the clamp.

3. A hose clamp comprising an endless wire frame including a body portion having two hose clamping limbs and overlapped ends, an integral screw receiving eye at one end of said clamp, a substantially inverted U-shaped integral buckle receiving loop at the other end of said clamp, said loop having vertical side limbs, a horizontal upper limb and an opened bottom, a buckle having lateral flanges extending from opposite sides thereof and engageable with said vertical limbs, said buckle having a lower stabilizing flange extending rearwardly therefrom and through said loop to span the opened bottom thereof when the parts are assembled, and a screw mounted on said buckle and engageable with the eye of said clamp to spread the ends thereof and constrict the clamp.

CARROLL W. PROCHASKA.

REFERENCES CITED

The following references are of record in the file of this patent:

UNITED STATES PATENTS

| Number | Name | Date |
|---|---|---|
| 492,855 | Weidaw | Mar. 7, 1893 |
| 1,912,100 | Rosenberg | May 30, 1933 |
| 2,349,809 | Black | May 30, 1944 |

FOREIGN PATENTS

| Number | Country | Date |
|---|---|---|
| 572,904 | Great Britain | Oct. 29, 1945 |